Oct. 12, 1965     F. E. BUSCHBOM     3,211,407
SILO UNLOADER TRIPOD SECURING MEANS
Filed Dec. 8, 1961     2 Sheets-Sheet 1
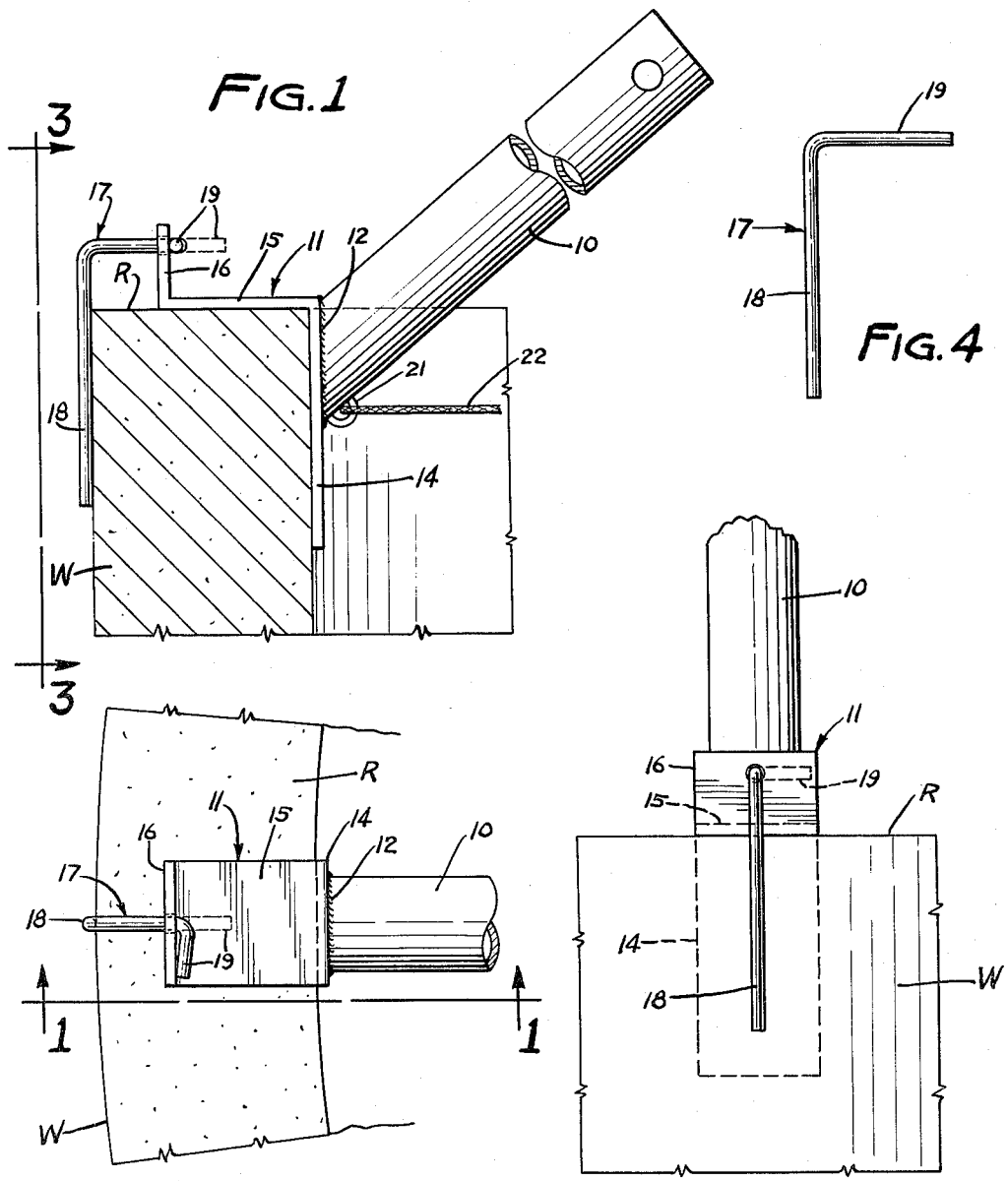
INVENTOR.
FLOYD E. BUSCHBOM
BY Moore, White & Burd
ATTORNEYS

United States Patent Office

3,211,407
Patented Oct. 12, 1965

3,211,407
SILO UNLOADER TRIPOD SECURING MEANS
Floyd E. Buschbom, Long Lake, Minn., assignor to Vandale Corporation, Long Lake, Minn., a corporation of Minnesota
Filed Dec. 8, 1961, Ser. No. 157,959
10 Claims. (Cl. 248—188.8)

This invention relates to improvements in silo unloader tripods and the like, and more particularly to a new and useful mounting means for tripod assemblies, such assemblies being mounted to the top rim of a tower silo and primarily intended for the suspension of a silo unloader within the silo.

In the design of tripods for silo unloaders it is strongly desired that the means of mounting the legs of the tripod to the top rim of the silo be as simple as possible to promote easy and quick mounting and dismounting, yet provide necessary functional supporting strength, without any tendency to be accidentally dislodged.

It is therefore an object of this invention to provide a new and useful tripod mounting assembly which may readily be mounted on and dismounted from the top rim of a tower silo or the like, and includes a simple, effective and inexpensive safety restraining means to prevent the tripod from accidental movement.

A further object of this invention is to provide a mounting assembly formed of a few strong and durable parts, so arranged to provide a very substantial and rigid structure.

Still further objects of this invention are those which are apparent and inherent in the structure as described, illustrated and claimed and will become more evident as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Reference is now made to the drawings in which corresponding numerals refer to the same parts and in which:

FIGURE 1 is a fragmentary side elevational view of the mounting means of this invention in position on the top rim of a silo, taken along the lines and in the direction of the arrows 1—1 of FIGURE 2;

FIGURE 2 is a fragmentary top plan view of the mounting means according to this invention;

FIGURE 3 is a view taken along the lines and in the direction of arrows 3—3 of FIGURE 1;

FIGURE 4 shows the L-shaped rod used to provide the safety restraining means according to this invention.

Figure 5:
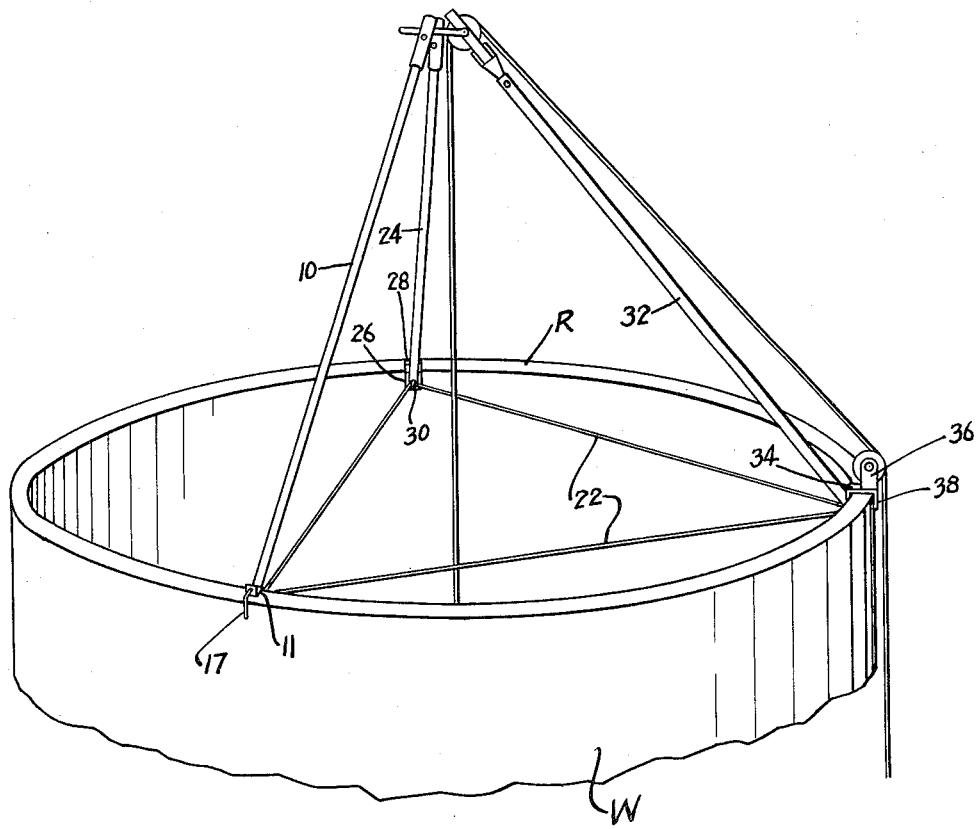
FIGURE 5 shows a tower silo fragment on which a tripod equipped with the securing means herein is mounted and drawn to a reduced scale.

Reference is now made specifically to FIGURE 1. In that figure is shown the upright wall W of a tower silo, shown in fragmentary illustration. The wall W is usually of right circular cylindrical section and extends upward into the air to a substantial elevation. It is provided with a top rim R and may be of any suitable construction such as wood, concrete, stave or the like.

It is to be understood that the tripod assembly is shown only in part since suffices to illustrate and describe the mounting means in cooperation with one leg of the tripod. The leg 10, as is well known, extends upwardly to a center assembly wherein cooperation with the other legs of the tripod a means is provided for suspending a supporting cable for a machine such as a silo unloader which is to be operated within the tower silo, as shown by my copending application, Serial No. 18,697, now Patent No. 3,128,081, incorporated herein by reference. The base of the leg 10 is supported and secured to an angular foot, generally designated 11. The angular foot 11 is formed from a rectangular plate of iron, steel or the like, and, as shown, comprises three adjoining sections resulting from its being formed by a series of right angle bends.

By means of weld 12, leg 10 of the tripod is secured to the outside surface of the first section 14 of the angular foot 11. The inner surface of section 14 is adapted to conform to and bear against the inside vertical surface of wall W. Although leg 10 may be secured to other sections of the foot 11, it is preferred that it be secured to the outside surface of section 14 since then the horizontal thrust resulting from a loaded tripod is substantially absorbed by the vertical wall. It has been found that by supporting the legs in this manner, the weld or other securing means is maintained structurally rigid and reliable.

A second section 15 of the angular foot 11 is adapted to conform to and bear against the top horizontal surface of the rim R of the silo. Section 15 adjoins the vertical section 14 and, as shown, extends horizontally at an angle of 90° relative thereto and terminates short of the outside edge of the wall.

The third section 16 of angular foot 11 adjoins section 15 and extends vertically at an angle of 90° relative thereto. This section is part of the safety restraining means of this invention hereinbelow defined.

To prevent the tripod assembly from inadvertently sliding off the rim R, the restraining means according to this invention includes a single L-shaped rod 17 which is adapted to engage the upwardly projecting third section 16. Section 16 is provided with an aperture of slightly larger diameter than that of L-shaped rod 17 to facilitate the engagement of the rod. When the L-shaped rod is engaged, end 18 of the rod bears against the outside surface of the wall and end 19 assumes the dotted line position shown in FIGURE 1. End 19 of the rod is then bent by blows from a hammer or in other fashion to the full line position of FIGURE 1. Thus, by ends 18 and 19 bearing against the outside wall and section 16, respectively, there is provided a safety restraining means to maintain the foot 11 of the mounting assembly secure, rigid and properly positioned. When it is desired to remove the foot 11 from the rim of the silo, it may merely be lifted upwardly.

As is to be readily appreciated the installation of the tripod can be done quickly and easily since the rod 17 is engaged in a natural manner and an installer is free to bend end 19 of the rod in whichever direction he chooses. This feature is appreciated since at the substantial elevations at which the installation is accomplished, the installer may find it extremely difficult to re-arrange his footing or position.

A modification of the mounting means is shown, wherein when silos of larger diameter are encountered, a further supporting means is provided. At the base of the leg 10 is shown a metal eye 21, which is secured to leg 10 by welding or other means. A restraining cable 22, shown in part may then be connected to the metal eye 21 and similarly to the eyes at the base of the other legs to form a triangular connection. By applying tension to this cable further support of the tripod assembly is provided.

In FIGURE 5 is shown a complete tripod of which leg 10 is a part. Foot 11 is shown and rod 17 may also be observed. Eye 21 is out of sight below the silo wall, but cable 22 can be seen leading to the eye.

Leg 24 is similar to leg 10 and is seen to have its foot 26 also engaging the rim R of the silo. It is also provided with a removable rod seen at 28. An eye 30 is secured to the unit and cable 22 extends also through this eye.

Leg 32 is similar to the other two legs and has a foot 34 that engages the top and inside of silo rim R. As shown herein, however, it employs a pulley bracket 36 which includes a securing member 38 to engage the outside of the wall of the silo. Member 38 may function in place of the removable rod of the other legs. Leg 32 is supplied with an eye, however, to which cable 22 may be secured.

When cable 22 is secured to all of the eyes, much of the outward thrust of the tripod legs is absorbed by the cable. This reduction in outward thrust applied to the silo is particularly valuable on large diameter silos where the angle of the legs relative to the horizontal is more acute than on smaller silos.

Thus, as will be appreciated, there is provided a tripod mounting assembly which may be readily and easily installed on a rim of a tower silo, yet precludes inadvertent disengagement therefrom, which permits construction of simple parts but insures ample strength for supporting substantial loads, which provides ease of manufacture and fulfills the foregoing listed objects of the invention.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A safety mounting assembly for the legs of a tripod comprising a positioning means having a first section adapted to conform to and bear against the inside vertical surface of the top rim of a tower silo, a second section adjoining said first section and adapted to conform to and bear upon the top horizontal surface of said rim, a third section adjoining said second section and projecting upwardly therefrom, said positioning means of said safety mounting assembly secured to a tripod leg and restraining means secured to said positioning means to prevent said safety mounting assembly from sliding off the rim of the silo.

2. The safety mounting assembly according to claim 1 further characterized in that said positioning means is an angular foot comprising a generally rectangular sheet of material, and that said sections of said angular foot are formed by a series of substantially 90° bends.

3. The safety mounting assembly according to claim 1 further characterized in that a tripod leg is secured to said first section of said positioning means.

4. A safety mounting assembly for a tripod leg comprising a positioning means having a first section adapted to conform to and bear against the inside vertical surface of the top rim of a tower silo, a second section adjoining said first section adapted to conform to and bear upon the top horizontal surface of said rim, a third section adjoining said second section and projecting upwardly therefrom, said positioning means of said mounting assembly rigidly secured to a tripod leg, restraining means secured to said positioning means third section for preventing said mounting assembly from sliding off the rim of the silo, and further restraining means including a flexible cable and a rigidly fastened eye secured to said positioning means of each safety mounting assembly for a tripod assembly.

5. In a safety mounting assembly for the legs of a tripod comprising a positioning means having a first section adapted to conform to and bear against the inside vertical surface of the top rim of a tower silo, a second section adjoining said first section conforming to and bearing upon the top horizontal surface of said rim, an apertured third section adjoining said second section and projecting upwardly therefrom, positioning means of said safety mounting assembly secured to a tripod leg, and restraining means including a removable rod penetrating said third section comprising a first portion adapted to bear against the outer vertical surface of said rim and a second portion adapted to bear against said third section of said foot when said second portion is bent over onto said third section, the aperture of said third section being of slightly greater diameter than said removable rod.

6. A safety mounting assembly for a tripod leg comprising a positioning means including an angular foot with a first section adapted to conform to and bear against the inside vertical surface of the top rim of a tower silo, a second section adjoining said first section adapted to conform to and bear upon the top horizontal surface of said rim, a third section adjoining said second section and projecting upwardly therefrom; securing means to rigidly fasten a tripod leg to said angular foot of said safety mounting assembly; restraining means including a removable rod adapted to engage said third section comprising a first portion adapted to bear against the outer vertical surface of said silo near said rim and a second portion adapted to bear against said third section of said foot when said second portion is bent over onto said third section after said rod is engaged therein, an eye welded to said angular foot and leg and flexible means secured to said eye.

7. A safety mounting assembly for the legs of said tripod assembly comprising a positioning means including an angular foot formed from a substantially rectangular sheet of metal, with a first section adapted to conform to and bear against the inside vertical surface of the top rim of a tower silo, a second section adjoining said first section adapted to conform to and bear upon the top horizontal surface of said rim, an apertured third section adjoining said second section and projecting upwardly therefrom, said first section being longer than said second and third sections, and all of said sections being defined by substantially right angle bends in said substantially rectangular sheet of metal, a tripod leg welded to said angular foot first section, a removable rod adapted to penetrate said third section aperture, said removable rod having a first portion adapted to bear against the outer vertical surface of said tower silo and a second portion adapted to extend through said third section of said angular foot and said second portion bent over onto said third section to secure said rod after said rod is engaged therein, an eye welded to said foot and leg, and a flexible means secured to said eye.

8. A tripod assembly for use in lifting a silo unloader or the like comprising, legs secured together to form a tripod, foot members secured to each leg, each foot member having a first section adapted to engage the inner wall of a silo near its rim, and a second section extending at an angle to said first section to engage the rim of said silo when said first section engages the inner wall of said silo, means secured to each of said feet and engaging the outer wall of said silo near its rim, eyes secured to each of said legs and feet, and a cable extending through all of said eyes and limiting the distance between said tripod legs at their feet.

9. The tripod assembly of claim 8 in which said means secured to each of two of said feet and engaging the outer wall of said silo near its rim comprises a third foot section extending vertically from said second foot section in a direction opposite to said first section, said third section being apertured, a rod having a portion extending through said aperture and a second section extending at an angle to said first portion to engage the outer wall of said silo, and the end of said first portion being bent over to engage said third foot portion to retain said second portion in said aperture.

10. The safety mounting assembly of claim 1 in which said restraining means comprises a member pivoted to said upwardly projecting third portion of said positioning means on an axis extending at substantially right angles to the silo wall engaging surface of said positioning means first section.

References Cited by the Examiner

UNITED STATES PATENTS

| | | | |
|---|---|---|---|
| 340,004 | 4/86 | Pinkston | 248—166 |
| 1,652,403 | 12/27 | Gerdeman | 182—128 |
| 1,676,723 | 7/28 | Baumgarten | 248—136 X |
| 2,357,165 | 8/44 | Brady | 248—194 |
| 2,491,008 | 12/49 | Lake | 248—42 X |

FOREIGN PATENTS 553,104  6/32  Germany.

CLAUDE A. LE ROY, *Primary Examiner.*

FRANK L. ABBOTT, *Examiner.*